UNITED STATES PATENT OFFICE.

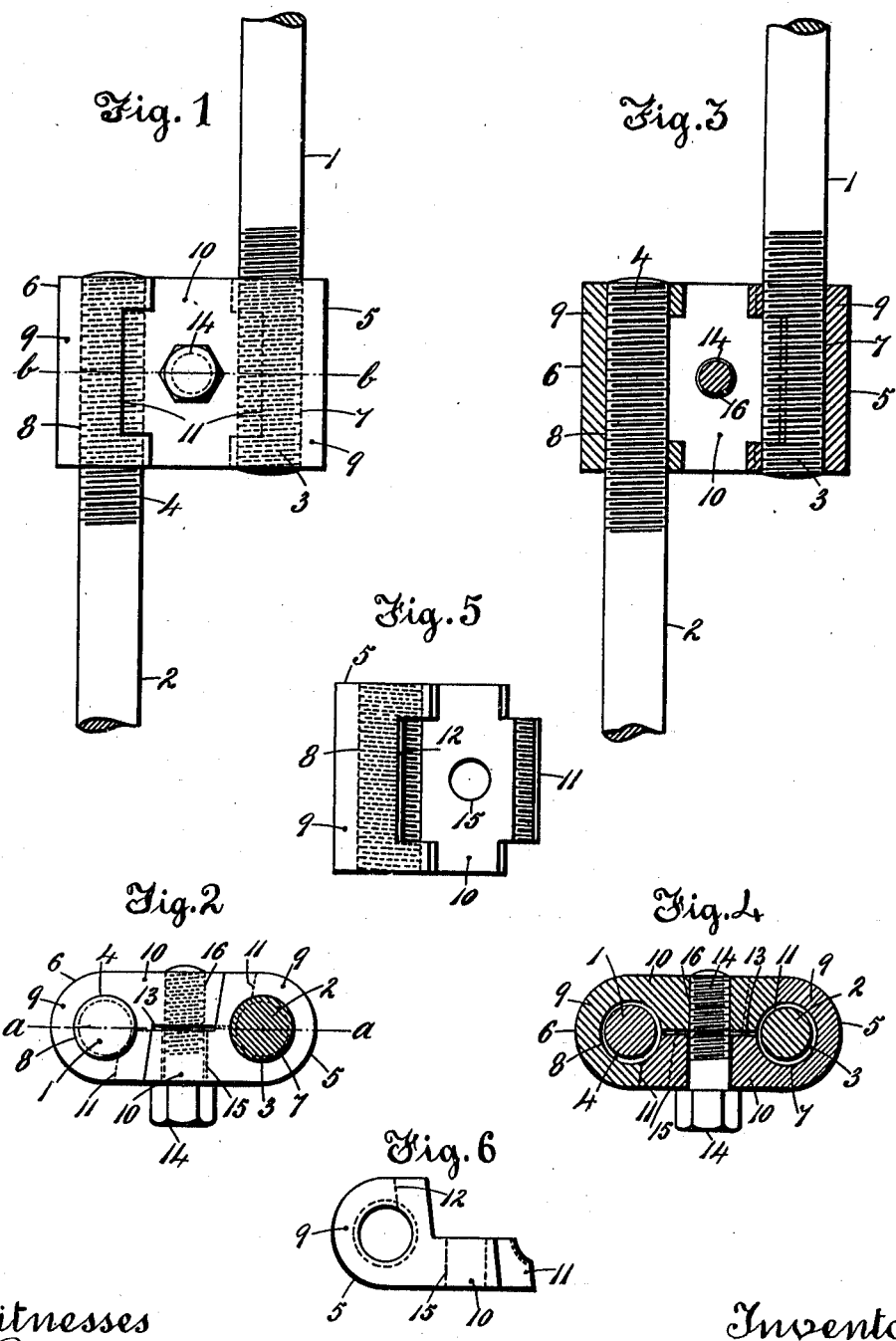

JAMES MELVIN JONES, OF HAMILTON, ONTARIO, CANADA.

COUPLING DEVICE.

1,004,574. Specification of Letters Patent. Patented Oct. 3, 1911.

Application filed February 24, 1911. Serial No. 610,608.

*To all whom it may concern:*

Be it known that I, JAMES MELVIN JONES, a citizen of the Dominion of Canada, residing at 22 King William street, in the city of Hamilton, in the county of Wentworth, in the Province of Ontario, Dominion of Canada, have invented a certain new and useful Coupling Device, of which the following is a specification.

This invention relates to coupling devices and it has more particular reference to that type of device for connecting together the adjacent screwed ends of two lengths of rod.

The main object of my invention is to provide an improved device of the foregoing nature which allows of the adjacent rods being relatively adjustable, and when so adjusted rigidly and positively connected together.

A further object of my invention is to furnish an improved coupling device of the type specified which locks itself at the same time that it rigidly and positively couples together the adjacent rod ends.

I attain these objects by the means illustrated on the annexed sheet of drawings, in which;

Figure 1, is an elevation of my improved coupling device, only so much of the adjacent rod ends being shown as is necessary for purposes of a clear understanding of the construction and arrangement of said device. Fig. 2, is a plan of the same. Fig. 3, is a vertical section on the line *a—a*, in Fig. 2. Fig. 4, is a transverse section on the line *b—b*, in Fig. 1. Fig. 5, is a detail view of one of the locking elements. Fig. 6, is a plan of the same.

Like reference numerals designate the same or similar parts in the several figures.

According to my invention and as applied to the operating connections for safety guards for stamping machines and the like 1, 2, are adjacent rods the ends whereof are respectively screw-threaded at 3, 4.

5, 6, are coupling blocks which are bored and threaded at 7, and 8, respectively to receive the ends 3, 4, and they are of any appropriate depth. Each block 5, 6, is preferably made of a cross section as shown best by Figs. 5, and 6; that is to say, each block is formed with a somewhat thickened longitudinal body part 9, which is drilled and threaded to receive one of the screwed ends of one of the rods 1, 2.

10, is a longitudinal extension to one side of the part 9, which is provided with a projection 11, adapted when the two blocks are assembled in proper relation to rabbet into a correspondingly shaped recess 12, formed for its reception in the opposing element as will be clearly comprehended from an inspection of Fig. 1. It is also to be particularly noted that I preferably form the meeting edges of the interlocking parts 11, 12, somewhat chamfered or tapered; also that the thickness of each part 10, is slightly less than half the thickness of the part 9, so that, when the parts are assembled, a space 13, (Figs. 2 and 4) intervenes for the purposes hereafter explained. Furthermore it is to be observed that each projection 11, is of a length to enter partially into the opposed bore 7 or 8, and that it is screw-threaded to coöperate with and form part of the thread therein.

14, is a cap screw passed through a hole 15, in the part 10, of the block 5, for example, and screwed into the correspondingly threaded hole 16, of the part 10, in the block 6, for binding the parts together. Obviously the threading of the bores 7, 8, may be effected after the parts 5, 6, are locked together by the cap screw 14, with a packing inserted in the space 13, as will be self-evident to those skilled in the art to which my invention appertains.

In use, one of the blocks 5, 6, is threaded onto each rod end 1, 2, the interlocking parts 11, 12, are brought together and the cap screw 14, driven sufficiently home to couple said parts easily together. The rods 1, and 2, are then properly adjusted to the desired degree whereupon the cap-screw 14, is tightened-up firmly locking the said rods against further rotation and longitudinal displacement, while at the same time the parts 5, 6, are immovably connected together consequent upon the chamfered edges jamming due to the clearance space 13. A reverse movement of the cap-screw 14, releases the parts.

From the foregoing description and drawings it will be seen that, by my invention, I provide a very effective device for the purpose specified and I do not restrict myself rigidly to the shape of the blocks 5, 6, exemplified, or to the particular method of obtaining an interlocking connection, for example, the chamfered faces may be serrated or roughened if desired.

Having described my invention what I claim as new and desire to secure by Letters Patent, is:—

1. A coupling device for connecting together the screwed ends of two adjacent rods comprising two interlocking members each of which consists of a body portion furnished with a screw-threaded bore, a longitudinal extension to one side of the aforesaid body portion, a projection upon the longitudinal edge of the extension, and a correspondingly shaped recess formed longitudinally at one side of the screw-threaded bore adapted to receive the projection of the opposed body portion when the parts are assembled, and means for rigidly and positively coupling together the aforesaid parts, substantially as described.

2. A coupling device for connecting together the screwed ends of two adjacent rods comprising two interlocking members each of which consists of a body portion furnished with a screw threaded bore adapted to receive one of the screwed rod ends, a longitudinal extension to one side of the aforesaid body portion and slightly less in thickness than half the thickness of the body portion, a projection upon the longitudinal edge of the extension having its inner edge hollowed out and threaded to coöperate with the bore of the opposed body portion, a corresponding shaped recess formed longitudinally at one side of the screw-threaded bore adapted to receive the projection upon the opposed interlocking member when the parts are assembled the meeting edges being all chamfered, and a cap screw for passage through a hole in one member and threading connection into the other member, all substantially as shown for the purposes specified.

Signed at Hamilton, Ontario, Canada, this 21st day of February, 1911.

JAMES MELVIN JONES.

In the presence of—
ALFRED T. BRATTON,
GERTIE NICHOLSON.

---

Copies of this patent may be obtained for five cents each, by addressing the "Commissioner of Patents, Washington, D. C."